350-453 SR

6/16/81 XR 4,273,956

United States Patent [19]

Wolfe

[11] 4,273,956

[45] Jun. 16, 1981

[54] AUDIOSCOPE PROJECT

[75] Inventor: Maynard F. Wolfe, Hong Kong, Hong Kong

[73] Assignee: Jag International Sales Limited, Hong Kong

[21] Appl. No.: 948,055

[22] Filed: Oct. 2, 1978

[30] Foreign Application Priority Data

Oct. 3, 1977 [GB] United Kingdom ............... 41035/77

[51] Int. Cl.[3] ............................................ H04M 11/00

[52] U.S. Cl. .................................... 179/1 H; 350/453

[58] Field of Search .......... 179/1 H, 1 HF, 37, 1 VC; 350/212, 235, 237, 243, 244

[56] References Cited

U.S. PATENT DOCUMENTS

| | | | |
|---|---|---|---|
| 2,169,874 | 8/1939 | Hardt | 350/243 |
| 2,262,203 | 11/1941 | Redstone et al. | 350/243 |
| 2,281,608 | 5/1942 | Vincent | 350/235 |
| 3,482,037 | 12/1969 | Brown et al. | 358/108 |
| 3,499,698 | 3/1970 | Malys | 350/243 |
| 3,514,188 | 5/1970 | Blosse et al. | 350/212 |
| 3,622,720 | 11/1971 | Allen | 200/61.58 R |
| 3,935,994 | 2/1976 | Darvishian | 179/1 H |
| 4,049,911 | 9/1977 | Schlaff et al. | 179/1 H |
| 4,082,434 | 4/1978 | Hayashi et al. | 350/212 |
| 4,116,529 | 9/1978 | Yamaguchi | 350/212 |
| 4,130,728 | 12/1978 | Grauel | 179/1 H |
| 4,172,636 | 10/1979 | Yanagimachi | 350/212 |

FOREIGN PATENT DOCUMENTS 985408 3/1965 United Kingdom .................... 179/1 H

*Primary Examiner*—Bernard Konick
*Assistant Examiner*—Randall P. Myers
*Attorney, Agent, or Firm*—Pollock, Vande Sande & Priddy

[57] ABSTRACT

The optical viewing device described comprises, in combination, an optical viewing tube for securing through the thickness of the door, an "outside" unit for attachment to the outside of the door and engaging around one end of the optical tube and an "inside" unit for securing to the inside of the door around the other end of the viewing tube, the "inside" and "outside" units including an audio microphone/speaker device to enable a caller audially to identify himself and the outside unit including a self-contained lighting unit to illuminate a caller. With such a device, a person inside the door can determine the identity and purpose of a caller before opening the door.

9 Claims, 6 Drawing Figures

AUDIOSCOPE PROJECT

This invention relates to optical viewing devices which are intended to be fitted to a door so that a person on the inside of a room closed by the door can inspect a person on the outside.

If the light in the region of the outside of a door to which such a device is fitted is insufficient properly to illuminate the caller, the standard viewing device cannot properly function and the caller cannot readily be identified. Also, persons with ill intent can either deliberately block out the device or can for instance, remove the lights in the porch or hall in which they are standing. It is generally very difficult to ascertain that such acts have been done deliberately, and it is therefore most difficult for the person inside the building to decide whether to open the door.

An optical viewing device in accordance with this invention for attachment to a panel such as that constituting a door comprises, in combination, an optical viewing tube for securing through the thickness of the door, an "outside" unit for attachment to the outside of the door and engaging around one end of the optical tube and an "inside" unit for securing to the inside of the door around the other end of the viewing tube, the "inside" and "outside" units including an audio microphone/speaker device to enable a caller audially to identify himself and/or the outside unit including a self-contained lighting unit to illuminate a caller.

Thus when a caller announces himself by, for example, ringing a call bell or knocking on a door to which a device in accordance with the invention is fitted, the user on the inside of the door can switch on the self-contained light unit, preferably by means of a switch on the inside unit, to illuminate the caller, and/or switch on the audio circuit so that the caller can verbally identify himself. Since the illumination unit will normally be arranged close to the optical device, the visitor may then hold up an identification card or the like in front of the optical unit, and this will be illuminated so as to enable the user on the inside of the door to establish the identity of the caller as is specified on the identity card. Since the unit is self-contained, the user will not have to open the door to enable a caller's identification card to be handed through the partially opened door.

If persons with ill intent are at the door, they will clearly attempt to disable the viewing device, but no doubt preferably (from their point of view) in such a way that it will not be obvious to the person within the apartment or fault that such disablement has been accomplished.

One obvious technique would be, where the door opens onto a hallway or an area that must be lighted by artificial light, that this light be removed or broken so that the person viewing the area through the door cannot make out the identity of persons on the other side.

The problem is that the failure of the outside light may be either accidental or deliberate, and a person on the inside of the door is very unlikely to be able to establish the cause of the failure.

In a viewing device according to the invention, one or more lights are incorporated in the outside unit, and are operable from inside the door by means in association with the inside unit.

This then provides a light by which a person outside the door can be identified with certainty, and, since the light will be adjacent the outlet of the outer end of the optical viewing unit, will provide light that is very suitable for identifying the intending entrant.

The lights therefore provide a test by which a person behind the door can ascertain whether the absence of light outside has been deliberately caused.

This is especially the case if the first unit has two lights, preferably one on either side of the veiwing tube, so that if both lights do not work and the outside passage light also does not work, it becomes quite certain that there is an attempt to mislead, and one would certainly not open the door in these circumstances. The self-contained speaker/microphone unit will allow the user to give instructions to the caller about identifying himself by use of his identity card, as well as enabling the caller to identify himself audibly.

Thus, a viewing device according to the invention incorporates a microphone loudspeaker combination within each unit, electronic means for powering of such devices and to provide for communication from each microphone arrangement to each loudspeaker arrangement on the other unit, and means associated with the second unit to activate the electronic powering means and, at least in one preferred embodiment, to provide means whereby the outside microphone device is activated to drive the inside loudspeaker but the inside microphone is not activated to drive the outside loudspeaker, and optionally vice versa.

The loudspeaker can act as a microphone in some instances, and it is not intended that there be necessarily separate devices to perform the microphone or loudspeaker function.

There is an advantage, of course, in having some visual indication that the electrical system is activated and operating, particularly to show when the batteries normally used in this device need replacement. It is therefore proposed to incorporate an indicator, such as a globe or an LED, which is activated upon activation of any of the electrical portions of the device.

The microphone/speaker unit may take the form of a simple acoustical tube rather than a powered amplifier/-microphone.

Preferably the device of the invention includes both the audio and lighting units, but it will be appreciated that if only one or the other is fitted, the device will still have advantages as compared with prior proposals.

One problem is that the optical viewing tube can be used by a person outside the door to view the area of the room protected by the door. Even though the image may be substantially distorted, it can still give the outside person a very good idea of what is within the room.

According to a further feature of this invention, a cover is associated with the inside unit which can be so held that in one position it covers the inside end of the optical viewing tube and in another position is separate from this and preferably in a second position it activates the lights or light on the first unit and also can activate the electronic means activating the microphone loudspeaker unit.

Another problem is that the outside unit together with the optical viewing unit can be damaged or removed by vandals.

While destruction cannot be totally avoided, such vandalism can be minimized if the outside unit is retained, at least in part by the strong body of the optical viewing unit. This is achieved by having a flange around the optical viewing unit engaging substantially around a portion of the outside unit and holding this tight against the outer face of the door or other panel.

The optical viewing tube can include a strong metallic casing and preferably has a forward engaging flange engaging and holding the outside unit tightly to the face of the door, and an adjustable barrel screw threaded around the body with an adjustable engaging flange which can be tightened against the rear face of the door. Also, in this way the device can be used with a range of door thicknesses.

Preferably, the inside unit can likewise be held by being engaged between the flange and the inner side of the panel or door.

With the inside unit, it is desirable to prevent exposure of light into the area through which one will view. It has therefore been proposed that there be a member of generally rectangular shape having a rear wall, an aperture through the rear wall which matches the lesser diameter of the screwable portion of the optical viewing unit, so that the flange on the screwable portion will engage and hold the back wall against the inner surface of the door, a remaining portion which generally closely fits between the outer wall and inner wall of the second unit whereby to provide a generally light proof viewing tunnel.

Additionally, it is preferred that the optical viewing tube which is forward of the face of the panel be flush with a front face of the outside unit, and that the optical elements also be flush with and not protruding from any planar face of the unit.

The invention is intended to encompass not only the device with the inside and outside units assembled to the optical tube but also "inside" and "outside" units ready for assembly.

The invention will now be described, by way of example, with reference to the accompanying drawings, in which.

Figure 1:
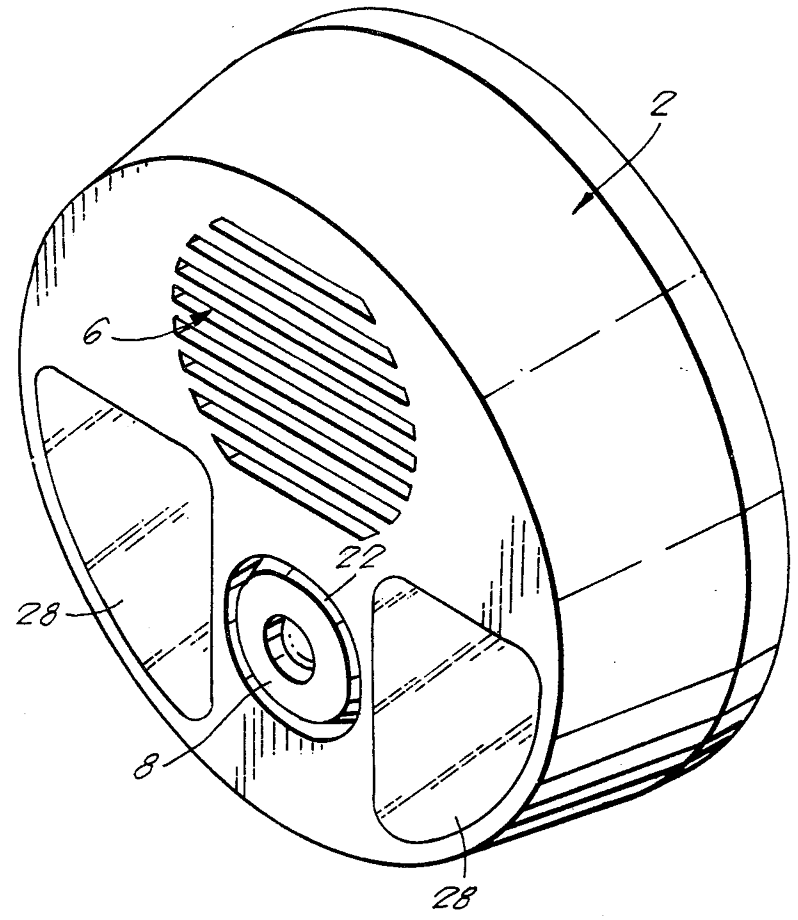
FIG. 1 is a perspective view of an "outside" unit of one optical viewing device.
Figure 2:
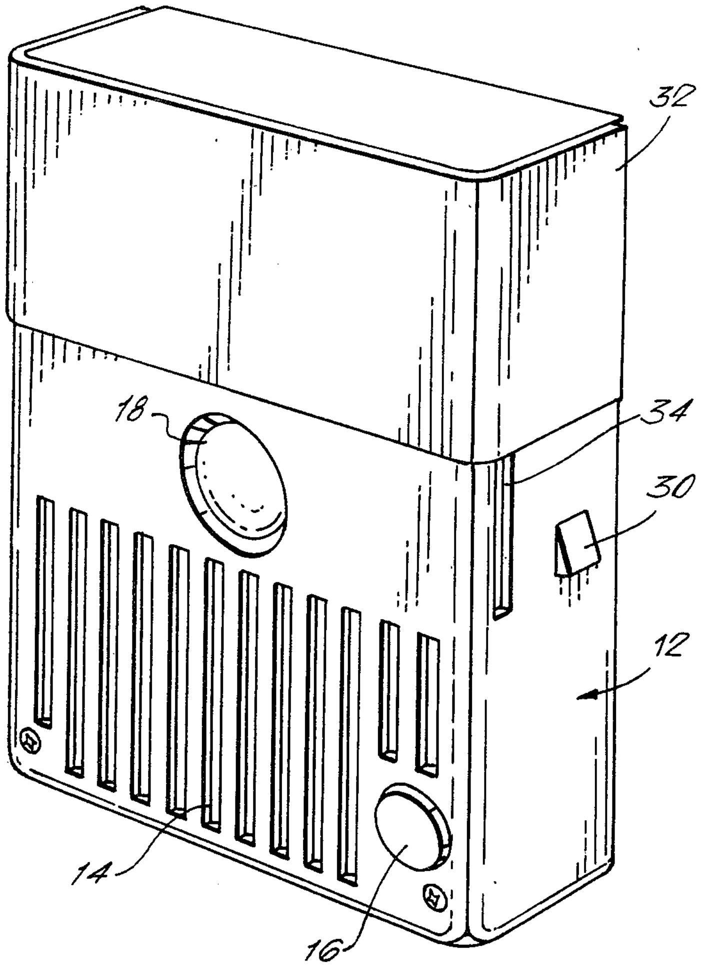
FIG. 2 is a perspective view of an "inside" unit of that device.
Figure 3:
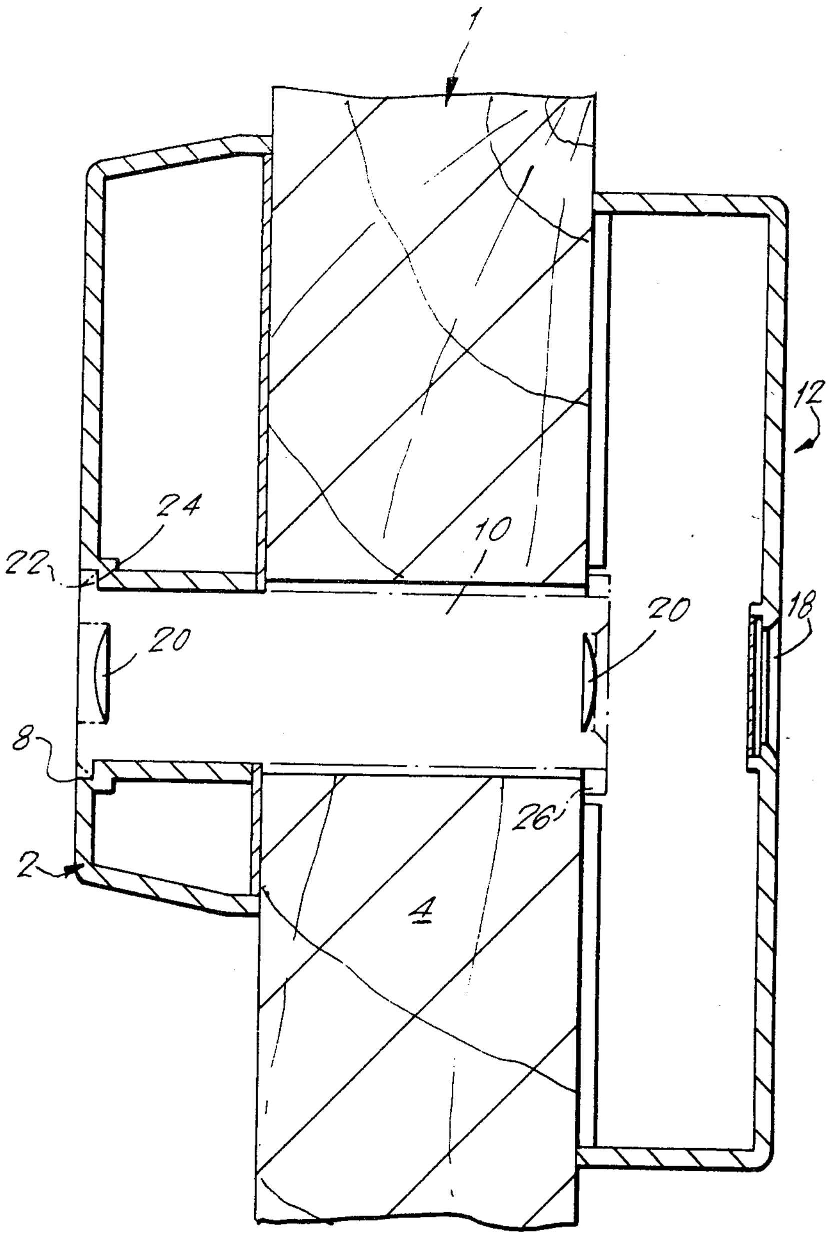
FIG. 3 is a section showing the device assembled on a door.

The optical viewing device 1 shown in FIGS. 1 to 3 comprises an "outside" unit 2 shown in FIG. 1 for fitting to the outside of a door 4 (see FIG. 3).

The unit is provided with a combined loudspeaker/-microphone unit 6 and is provided with an aperture 8 to receive one end of an optical viewing tube 10 which extends through the thickness of the door 4 from the inside to the outside.

An "inside" unit 12 shown in FIG. 2 is fitted to the inside of the door and is provided with a loudspeaker/-microphone unit 14 similar to the unit 6, the power for the units 6 and 14 being controlled by a two-way switch 16 whose position depends upon whether the person on the inside of the room wishes to speak or listen.

As can be seen in FIG. 3, the "inside" unit 12 is secured around one end of the optical viewing tube 10 and is provided with an aperture 18 aligned with appropriate viewing lenses 20 of the tube, so that a person on the inside of the room can visually inspect a caller standing outside the door opposite the other end of the tube.

As can be seen clearly in FIG. 3, the outer end of the tube is formed with a barb or flange 22 which engages against a shoulder 24 of the outer unit so that the outer unit is held in position by its engagement with the viewing tube. The inner end of the viewing tube is secured firmly in position against the inside of the door by means of a collar 26.

The outside unit 2 also incorporates a self-contained lighting unit which is mounted adjacent the outer end of the viewing tube 10 so as to be able to illuminate, through transparent panels 28, (see FIG. 1), a person standing in front of the outside unit, so that a user can inspect a caller through the viewing tube even if the caller is standing in darkness. The lighting unit is operated by means of main power on/off switch 30 on the inside unit.

In use, when a caller either knocks on the door or rings an appropriate bell, a person inside the room closed by the door can turn the main power switch 30 to illuminate the caller, so that he can be inspected visually through the viewing tube 10. The user can also operate the switch 16 to a position in which he can speak to the caller and ask the caller both to identify himself audially (on operation of the switch 16 to its second operative position), and if necessary to instruct him to hold up an identity card close to the viewing tube, where it will be illuminated by the lighting unit and enable the user to compare the identity card with the caller.

Figure 4:
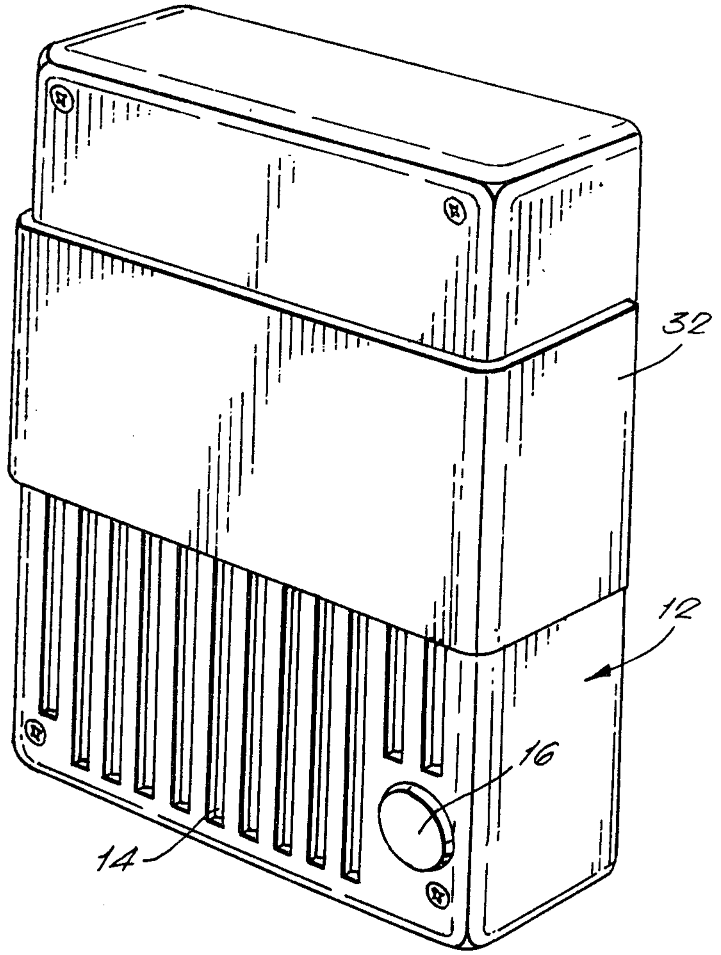
FIG. 4 is a view similar to FIG. 2 but showing the "inside" unit in its inoperative position.

When the unit is out of use, a sliding cover 32 (see FIG. 2) is slid down in guide tracks 34 to the position shown in FIG. 4, in which it acts both to switch off the main switch 30 and to cover the viewing aperture 18. This prevents anyone looking through the tube from the outside of the door to the inside of the room.

Figure 5:
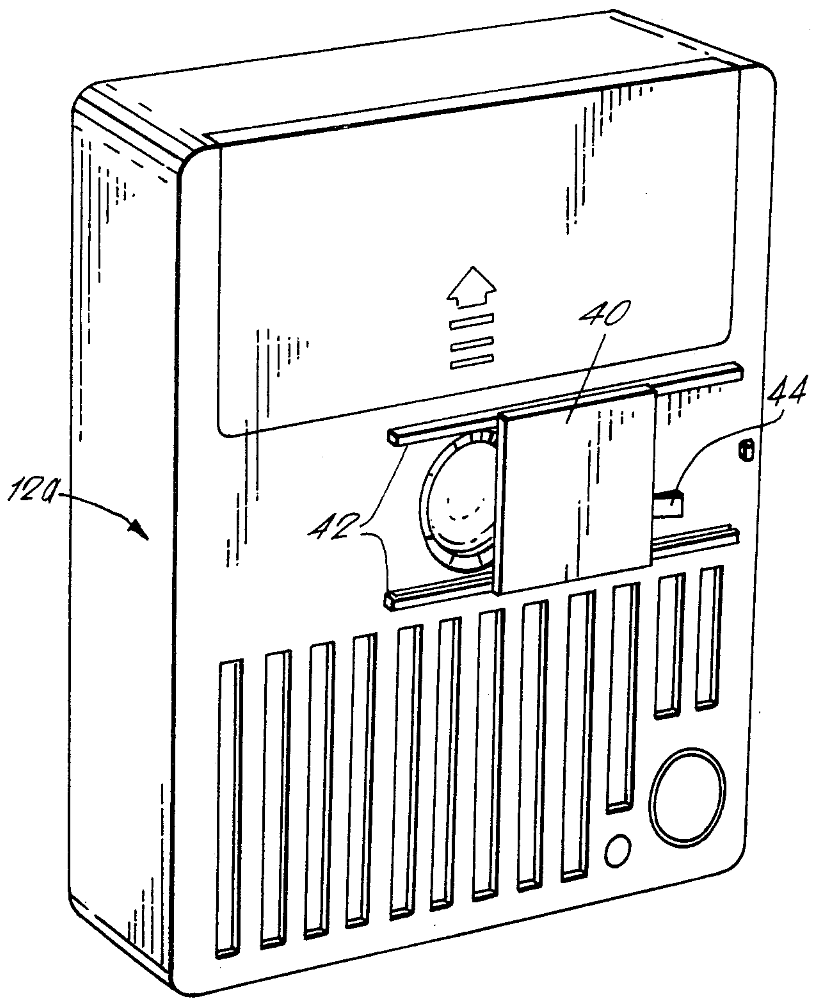
FIG. 5 is a perspective view of the "inside" unit of another optical viewing device.

FIG. 5 shows a modified inside unit 12*a*. This unit differs from the unit 12 in that a small panel 40 is mounted on horizontal tracks 42 for sliding movement between a position where it covers the end of the tube 10 and a position to the right of this where the end of the tube 10 is uncovered and the panel depresses and switches on a main power switch 44.

Figure 6:
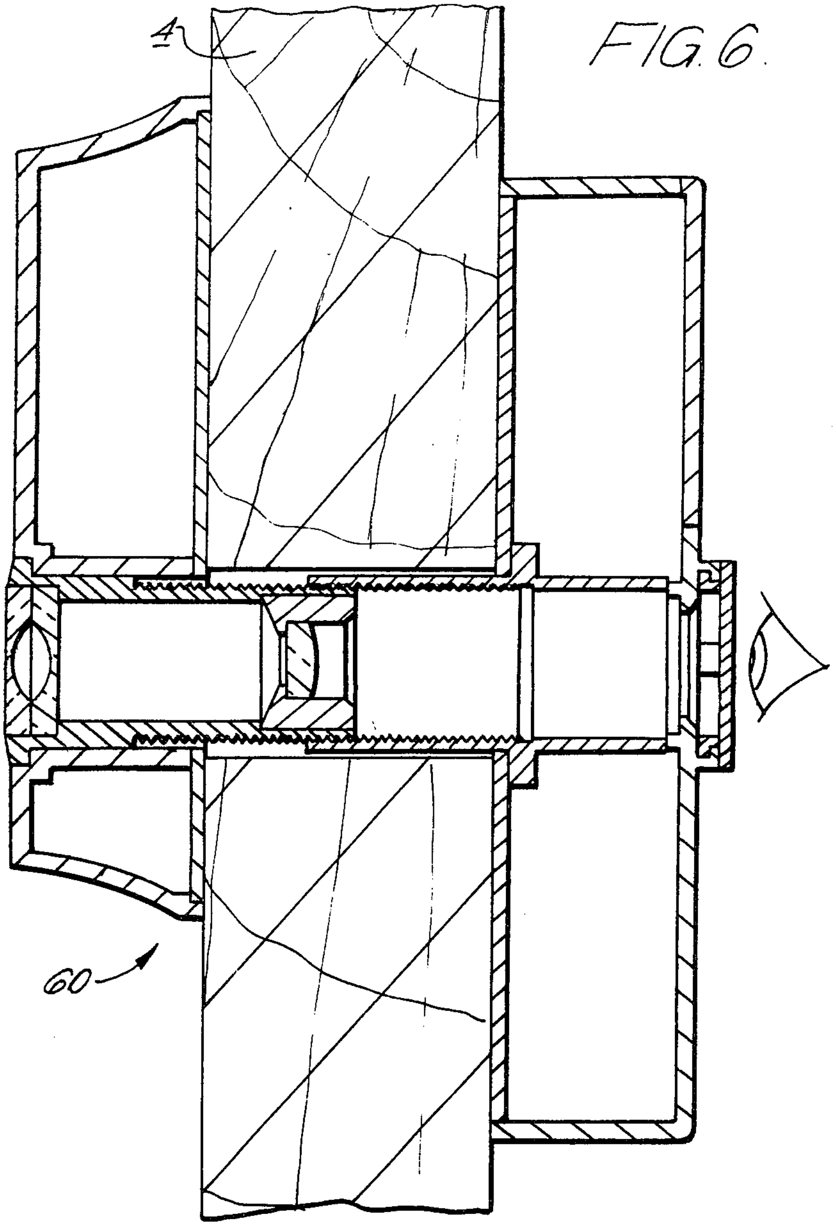
FIG. 6 is a section showing a further device assembled on a door.

FIG. 6 shows a section through a further embodiment 60 of the device, and in particular of the viewing tube 10. Shown in this figure is a lens system which provides a substantial viewing angle (165° in the example shown), while at the same time permitting the viewing to keep in focus things outside the partition, no matter whether they are located very close to the lens or quite distance from it, and with the eye of the viewer at varying distances from the eye-piece of the lens system.

What we claim is:

1. An audio-visual caller identification device for attachment to a partition to permit audio and visual access from one side to the other side thereof, comprising (a) an outside unit for attachment at the outer side of said partition;

(b) an inside unit for attachment at the inner side of said partition;

(c) a viewing tube adapted to be secured to said partition in a position in which it extends from said one side to said other side thereof through an aperture therein;

(d) a switch on said inside unit, movable from its "on" position in which it projects from the surface of said inside unit, to its "off" position in which it is depressed toward said surface of said inside unit; and (e) a cover associated with said inside unit and movable from a first position in which it covers the inner end of said viewing tube and retains said switch in its "off" position, to a second position in which said inner end of said viewing tube is uncovered, releasing said switch to its "on" position;

(f) said outside and inside units each comprising an audio device comprising microphone means and speaker means, to facilitate audio-communication between individuals located on opposite sides of said partition.

2. An audio-visual caller identification device for attachment to a partition to permit audio and visual access from one side to the other side thereof, comprising (a) an outside unit for attachment at the outer side of said partition;

(b) an inside unit for attachment at the inner side of said partition;

(c) a viewing tube adapted to be secured to said partition in a position in which it extends from said one side to said other side thereof through an aperture therein, said viewing tube extending through said outside unit and having one of its ends engaged by the latter, and said inside unit engaging around the other end of said viewing tube;

(d) said outside and inside units each comprising an audio device comprising microphone means and speaker means, to facilitate audio-communication between individuals located on opposite sides of said partition;

(e) said outside unit further comprising a lighting device for illuminating an individual located at the outer side of said partition; and (f) means on said inside unit for activating said lighting device and said audio device and for controlling visual access through said viewing tube.

3. An audio-visual caller identification device as claimed in claim 2, wherein said lighting device comprises two lights, one on either side of said viewing tube.

4. An audio-visual caller identification device as claimed in claim 2, comprising a cover associated with the inside unit and slidable from a first position in which it covers the inner end of said viewing tube to a second position in which said inner end is uncovered.

5. An audio-visual caller identification device as claimed in claim 4, wherein movement of said cover to said second position turns on said activating means.

6. An audio-visual caller identification device as claimed in any one of claims 2, 1, 3, 4 or 5, wherein said viewing tube has a strong metallic casing and comprises a flange for engaging and holding said outside unit to the outside face of said partition and an adjustable barrel screw threaded around its body with an adjustable engaging flange for tightening against the rear face of said partition.

7. An audio-visual caller identification device as claimed in claim 6, wherein the outer end of said viewing tube is flush with the front face of said outside unit.

8. An audio-visual caller identification device for attachment to a partition to permit audio and visual access from one side to the other side thereof, comprising (a) an outside unit for attachment at the outer side of said partition;

(b) an inside unit for attachment at the inner side of said partition;

(c) a viewing tube adapted to be secured to said partition in a position in which it extends from said one side to said other side thereof through an aperture therein, said viewing tube extending through said outside unit and having one of its ends engaged by the latter, and said inside unit engaging around the other end of said viewing tube; and (d) a cover associated with said inside unit and slidable from a first position in which it covers the inner end of said viewing tube to a second position in which said inner end is uncovered;

(e) said outside and inside units each comprising an audio device comprising microphone means and speaker means, to facilitate audio-communication between individuals located on opposite sides of said partition;

(f) said outside unit further comprising a lighting device for illuminating an individual located at the outer side of said partition;

(g) movement of said cover to said second position activating said lighting device and said audio device.

9. An audio-visual caller identification device for attachment to a partition to permit audio and visual access from one side to the other side thereof, comprising (a) an outside unit for attachment at the outer side of said partition;

(b) an inside unit for attachment at the inner side of said partition;

(c) a viewing tube adapted to be secured to said partition in a position in which it extends from said one side to said other side thereof through an aperture therein, said viewing tube extending through said outside unit and having one of its ends engaged by the latter, and said inside unit engaging around the the other end of said viewing tube;

(d) said viewing tube having a strong metallic casing and comprising a flange for engaging and holding said outside unit to the outside face of said partition and an adjustable barrel screw threaded around its body with an adjustable engaging flange for tightening against the rear face of said partition;

(e) said outside and inside units each comprising an audio device comprising microphone means and speaker means, to facilitate audio-communication between individuals located on opposite sides of said partition;

(f) said outside unit further comprising a lighting device for illuminating an individual located at the outer side of said partition; and (g) means on said inside unit for activating said lighting device and said audio device and for controlling visual access through said viewing tube.

* * * * *